United States Patent [19]

Lomet

[11] Patent Number: 5,596,754
[45] Date of Patent: Jan. 21, 1997

[54] METHOD FOR PERFORMING PRIVATE LOCK MANAGEMENT

[75] Inventor: David B. Lomet, Westford, Mass.

[73] Assignee: Digital Equipment Corporation, Maynard, Mass.

[21] Appl. No.: 549,294

[22] Filed: Oct. 27, 1995

Related U.S. Application Data

[63] Continuation of Ser. No. 216,787, Mar. 23, 1994, abandoned, which is a continuation of Ser. No. 968,193, Oct. 29, 1992, abandoned.

[51] Int. Cl.⁶ .............................. G06F 13/36; G06F 12/14
[52] U.S. Cl. .............. 395/726; 395/200.03; 395/200.08; 395/288
[58] Field of Search ...................................... 395/650, 700, 395/200.08, 200.03, 288, 600, 726, 728, 732; 364/969.2

[56] References Cited

U.S. PATENT DOCUMENTS

| | | | |
|---|---|---|---|
| 4,399,504 | 8/1983 | Obermarck et al. | 364/200 |
| 4,480,304 | 10/1984 | Carr et al. | 364/200 |
| 4,716,528 | 12/1987 | Crus et al. | 364/300 |
| 4,965,719 | 10/1990 | Shoens et al. | 364/200 |
| 5,095,421 | 3/1992 | Freund | 395/650 |
| 5,161,227 | 11/1992 | Dias et al. | 395/650 |
| 5,175,852 | 12/1992 | Johnson et al. | 395/600 |
| 5,202,971 | 4/1993 | Henson et al. | 395/425 |
| 5,226,143 | 7/1993 | Baird et al. | 395/425 |
| 5,226,159 | 7/1993 | Henson et al. | 395/650 |
| 5,251,318 | 10/1993 | Nitta et al. | 395/725 |
| 5,327,556 | 7/1994 | Mohan et al. | 395/600 |

OTHER PUBLICATIONS

*Adaptive Locking Strategies in a Multi-node Data Sharing Environment*, Ashok M. Joshi, Digital Equipment Corporation, Barcelona, Sep., 1991.
*Granularity of Locks and Degrees of Consistency in a Shared Data Base*, J. N. Gray, R. A. Lorie, G. R. Putzolu, I. L. Traiger, IBM Research Laboratory, San Jose, California.
*Efficient Locking and Caching of Data in the Multisystem Shared Disks Transaction Environment*, C. Mohan, Inderpal Narang, IBM Almaden Research Center, Aug. 15, 1991.
"Distributed Lock Management in a Transaction Processing Environment" by Andrew B. Hastings 1990, pp. 22–31.

Primary Examiner—Alvin E. Oberley
Assistant Examiner—Michael T. Richey
Attorney, Agent, or Firm—Denis G. Maloney; Arthur W. Fisher

[57] ABSTRACT

Lock management in a distributed data sharing computer system in which resources are shared by servers having local lock managers and the computer system having a global lock manager. Lock modes are defined to govern the availability of resources to the servers, including defining at least one lock mode that conflicts with at least another of the lock modes without covering any locks associated with the lock modes. Locks indicative of a specific lock mode are assigned to the resources. Requests for access to the resources are administered by a local lock manager associated with the requesting server without exposing the lock modes associated with the locks on the resources to the global lock manager unless the requests for access relate to a resource that is not covered by a lock assigned by the global lock manager.

21 Claims, 3 Drawing Sheets

BEFORE LOCK DEMOTION

AFTER LOCK DEMOTION

METHOD FOR PERFORMING PRIVATE LOCK MANAGEMENT

This application is a continuation, of application Ser. No. 08/216,787 filed Mar. 23, 1994 now abandoned which is a continuation of application Ser. No. 07/968,193, filed Oct. 29, 1992, now abandoned.

FIELD OF THE INVENTION

The present invention relates to the control of access to shared resources in computer systems and, more particularly, to a method for performing private lock management in a distributed dam sharing computer system.

BACKGROUND OF THE INVENTION

A distributed dam sharing database system is a system in which multiple servers access common data. In such a system, it is desirable to enable component systems to be as independent as possible to minimize the degree of coordination required with a concomitant reduction in communication penalties to throughput and response time. This has been difficult in data sharing systems such as Rdb/VMS. The VMS lock manager is an example of a global lock manager that is used to mediate data requests. The notion of private lock management is introduced as a way to permit the servers to perform private locking that reduces global coordination. Private locking makes it possible for servers to execute transactions and to do locking for their clients without frequent calls upon the global lock manager to mediate the data accesses. Private locking improves the performance of data sharing systems yielding an improvement in both SMP and cluster scalability.

The notion of multi-granularity locking is well-known in the art. Lock promotion and demotion have been used by Rdb/VMS processes that expose all lock modes to a global lock manager. Very limited forms of private locking are known, but with an intrinsic sacrifice to concurrency.

Two primary types of distributed database systems are known in the art. The first type of system is referred to herein as a "shared nothing" system. In a "shared nothing" system, each subset (partition) of the data is accessed by only one server at a time. When accessing data from several partitions, messages are needed to orchestrate the execution of each transaction. Further, the two phase commit protocol is usually used to provide coordinated commit.

With partitioned systems, all updates are done by the single server for a partition, lock management for resources of the partition is done at this server and locks are held by transactions running at the server. Other servers can acquire only copies of the data and cannot update the data directly.

A second type of database system is known as a data sharing system. In a data sharing system, multiple servers can access all data simultaneously. Such simultaneous access requires low level coordination, including distributed locking. A single server, does not need to exchange messages with other servers for request execution or for commit coordination when only shared data is accessed. With data sharing, a user may access many resources via a single server, and hence need to perform lock management for the resource. However, remote servers will frequently hold locks on the resource when they have data of the resource present in their database cache. Remote servers may or may not be executing transactions involving a resource, and so can cache data for extended periods, and can frequently relinquish locks on data that is not accessed by an active transaction. Object oriented database systems that perform client caching of data are examples of data sharing systems.

As will be apparent to one of ordinary skill in the field, it is also possible to have hybrids of these systems in which both partitioning and data sharing is used.

Server independence, which means the ability of servers to execute with minimal coordination, is clearly desirable, but represents a problem for data sharing systems, which require coordination protocols to control the management of the database cache, recovery and locking. Recently, advances have been made that permit increased server independence, and hence reduce the overhead for data sharing systems. The development of principles involved in enabling lock management to be done with more independence is a desirable goal. Specifically desirable is a data sharing system in which each server, by holding appropriate global locks on resources, can perform lock management privately on these resources for transactions that it executes. This strategy permits a systematic reduction in the costs associated with distributed lock management.

SUMMARY OF THE INVENTION

For a data sharing database system, substantial coordination cost is incurred to cope with the global, or distributed, locking needed by these systems. Lock covering is a way to permit component systems to perform private (local) locking. The present invention employs two forms of covering locks, together with intention locks, which are needed to prevent covering violations. Intention locks give permission for lower level locking to be used, but require that the locking be global. The present invention also defines novel lock modes to provide exclusion without being covering locks. These locks facilitate database cache management, permitting exclusion with high concurrency. By maintaining information about both global and local locks, a local lock manager can ensure that it will not inadvertently release global locks needed to cover private (local) locks. The method of the present invention extends traditional multi-granularity locking and is capable of exploiting multi-level transactions where locks are released prior to transaction end.

BRIEF DESCRIPTION OF THE DRAWINGS

Other advantages of the invention will become apparent upon reading the following detailed description and upon reference to the accompanying drawings, in which.

Figure 1:
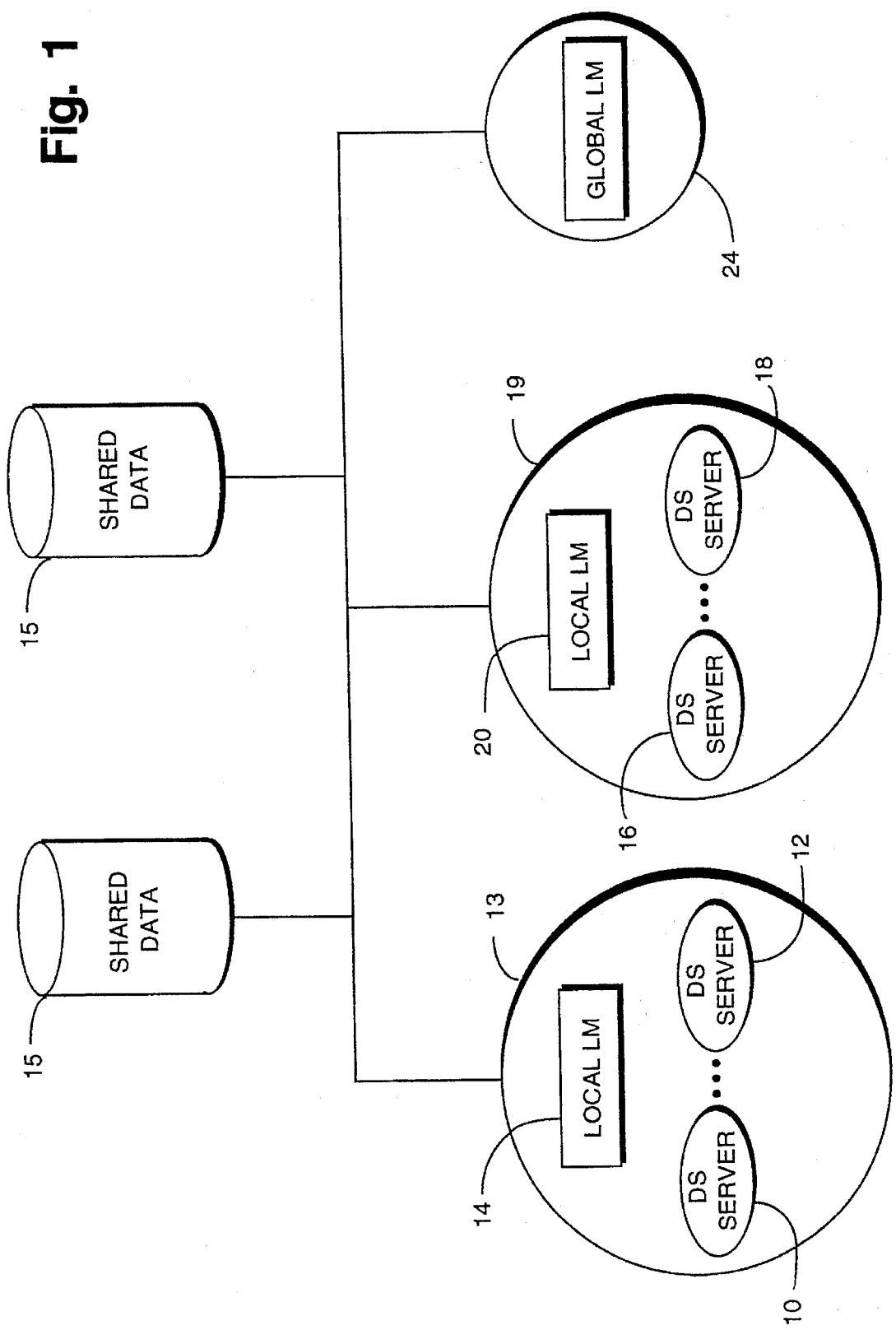
FIG. 1 is a block diagram showing a data sharing computer system having local and global lock managers.

While the invention is susceptible to various modifications and alternative forms, a specific embodiment thereof has been shown by way of example in the drawings and will herein be described in detail. It should be understood, however, that the invention is not intended to be limited to the particular form disclosed. On the contrary, the intention of the applicant is to cover all modifications, equivalents, and alternatives falling within the spirit and scope of the invention as defined by the appended claims.

DETAILED DESCRIPTION OF THE PREFERRED EMBODIMENT

FIG. 1 is a block diagram showing a data sharing computer system having local and global lock managers. The system of FIG. 1 provides a useful backdrop from which to discuss the private lock management method of the present invention. A plurality of servers 10, 12, which perform data management functions for a first local area 13, are associated with a first local lock manager 14. The servers 10, 12 have access to shared resources 15, such as files. A plurality of servers 16, 18, which perform data management functions for a second local area 19 are associated with a second local lock manager 20. The servers 16, 18 also have access to the shared resources 15. As previously described, the local lock managers 14, 20 have the ability to grant or withhold locks and maintain the status of locks granted on the shared resources 15. A global lock manager 24 communicates with the local lock managers 14, 20.

The local lock managers 14, 20 perform local locking functions according to the present invention. That is, local locks are managed to the extent possible by the local lock managers 14, 20 without exposing their operations to the global lock manager 24. The reduction in communication overhead realized by the minimization of communication with the global lock manager 24 is substantial.

Known local lock managers can be modified to perform the method of the present invention. Specifically, existing lock managers must be modified to distinguish between local locks and global locks. Additionally, lock managers must be modified to allow recognition of global covering locks. Any known method of achieving these modifications is within the scope of the invention. The specific details regarding the accomplishment of these modifications will be apparent to those skilled in the art. Moreover, these details are not an essential feature of the present invention.

Locks conflict whenever two principals must be prevented from holding locks at the same time. Lock managers detect conflicts between locks requested by separate principals on the same resource. The purpose of this function is to allow the principal that acquired a lock to perform certain accesses that are otherwise denied to principals that have not acquired the lock. The lock manager does not grant a lock to a principal when that lock conflicts with a lock on the same resource that is held by another principal.

As will be apparent to one of ordinary skill in the field, lock modes can be defined to enable or prevent certain kinds of access to resources, rather than completely blocking all access. Classically, there have been two primary lock modes.

The first lock mode, exclusive (identified herein as "X"), permits both the reading and the updating of the resource so locked by the principal who has acquired the lock. X locks prevent all accesses by any other principal. The lock manager enforces the rule that only one principal at a time can have an X lock mode on a given resource.

The second lock mode, share (identified herein as "S"), permits multiple principals to read a resource concurrently while preventing an update from changing the resource while readers hold S locks.

CONFLICTS(m), where m is a lock mode, is defined to be the set of lock modes that conflict with a lock of lock mode m when accesses are made to the same resource.

For the lock modes above, CONFLICT(X)={X,S} while CONFLICT(S)={X}.

Two lock modes, $m_1$ and $m_2$, are compatible if they do not conflict. This relationship is expressed as follows: $m_1$ COMPAT $m_2$. Further, COMPAT($m_1$) is defined as the set of lock modes compatible with $m_1$. COMPAT($m_1$)=ALL CONFLICT($m_1$).

For purposes of this discussion, the lock mode ms is defined to be STRONGER than lock mode $m_2$ if:

$$\text{CONFLICTS}(m_2) \subseteq \text{CONFLICTS}(m_1). \qquad [1]$$

Hence, X is stronger than S. A lock on a resource in a strong mode is said to be stronger than a lock in a weaker mode on the same resource. Stronger is transitive and forms a partial ordering among lock modes. When a principal changes a lock on a resource from one lock mode to another, this is called lock conversion. For purposes of this application, conversion from a strong mode to a weaker one is termed "lock demotion" and conversion from a weak mode to a stronger one is termed "lock promotion."

Lock Covering

Locking is usually conservative, preventing more accesses than are strictly required for correct serializable execution. This is done, for example, to prevent deadlocks or to facilitate recovery. Conservative locking results in the resources being locked with larger granularities and the locking modes being more restrictive than needed. This is acceptable so long as the concurrency permitted by the locks is sufficient; however, concurrency is sacrificed. What is required is that a lock be sufficiently strong to prevent accesses that would compromise serialization. Any stronger lock that "covers" a sufficient lock is also acceptable.

Lock A COVERS lock B if every action prevented by B is also prevented by A. Alternatively, lock A COVERS lock B if every action permitted by A is also permitted by B. [2]

For purposes of the present invention, the COVERS metric is extended to include the case when more than one lock is required in order for covering to apply. A set of locks $S_1$ COVERS a lock B if by holding all locks in $S_1$, every action prevented by B is also prevented by the locks in $S_1$. The set $S_1$ is a minimum cover for B if it is not possible to remove a lock from $S_1$ and still cover B. Lock covering is transitive.

There are two ways in which lock A can cover another lock B: direct lock covering and resource lock covering. Direct lock covering is defined as follows:

Lock A directly covers (DCOVERS) lock B if locks A and B guard the same resource and the lock mode of A, denoted M(A), is STRONGER than the lock mode of B, denoted M(B)]

Hence, a lock on a resource in mode X directly COVERS locks on the same resource of modes S or X. Further, a lock in mode S directly COVERS only other S mode locks on the same resource.

It is important to note that conventional lock managers only detect conflicts among locks on a single resource. Hence, direct covering is the only covering of which a lock manager is usually aware.

Distributed Lock Management

A transaction executing at a server makes requests for data to that server. That server then needs to grant a lock on that data to the transaction. To do that when the data accessed is shared data, it may require the server to make lock requests to other servers. The reason is that transactions at other servers can compete for the same resource and conflicting accesses among all these principals (servers) must be prevented. Thus, a server must be prepared to make its lock requests visible to other servers. This is called distributed lock management and it is the traditional problem for data sharing systems.

Preventing conflicting accesses among servers does not require that all locks be visible globally. Covering can be exploited to partition locking responsibility between multiple lock managers on different servers. A server can acquire a strong covering lock on a resource and can then mediate and grant lock requests that it receives for this resource so long as its lock covers the locks being requested.

Direct covering provides some leverage for private lock management. However, larger possibilities arise with multi-granularity locking, which can be used to permit a lock on a large granule (for example, a file) to be exposed while the locks on pages of the file are managed privately.

The remainder of this application is primarily concerned with the principles involved with private versus public management of locks in data sharing DBMSs. Covering for multi-granularity locks is defined and the interactions of covering locks with intention locks is discussed. The concept of covering is generalized to include the interaction of logical locking and flexible cache management. The functioning of multiple local lock managers to support private locking is explained.

Resource Covering For Multi-granularity Locks

It is possible for a lock or locks to cover another lock even when the locks are not on the same resource. The classic example of this is multi-granularity locking. For example, the purpose of a lock (X or S) on a large granule (a file) that contains other smaller granularity resources (pages) is for the file lock to also lock the pages of the file in the same mode. Thus, a file lock of X or S should cover X or S locks on the pages. This is an instance of a tree locking granularity hierarchy.

More generally, a set of resources $R_1$ can jointly guard resource $r_2$ such that when resources in $R_1$ are locked, locks on resource $r_2$ are covered, where $r_2$ is not a member of $R_1$. A file may have multiple secondary indexes, where it is desired to cover locks on the records of the file through the use of locks on entries in the indexes. Thus, resources can have more than one "ancestor" and the multi-granularity hierarchy is a directed acyclic graph ("DAG"). For purposes of the present application, the multi-granularity locking hierarchy, whether tree or DAG, is designated as the "MGH".

Then, a set of locks {A} on resources in set $R_1$ resource COVERS a lock B on resource $r_2$ where $R_1$ guards $r_2$ in a multi-granularity lock hierarchy if {A} COVERS B. If all locks in {A} have the same lock mode M ({A}) RCOVERS $(R_1, r_2)$ M(B). The following definitions also apply:

$$RCOVERS(R_1, r_2)[M]=\{N|M\ RCOVERS(R_1, r_2)\ N\} \qquad [4]$$

If M RCOVERS $(R_1, r_2)$ N for all $r_2$ in $R_2$ and N RCOVERS $(R_2, r_3)$ P then M RCOVERS $(R_1, r_3)$ P. This is the transitivity form for RCOVERS.

By the transitivity of DCOVERS, if L DCOVERS M then $$RCOVERS(R_1, r_2)[M] \subseteq RCOVERS(R_1, r_2)[L] \qquad [5]$$

Note that the lock modes for $R_1$ may be different from the lock modes for $r_2$. Furthermore, there is not necessarily a DCOVER relation between the lock modes for $R_1$ and those for $r_2$.

Intention Locks

Usually, a lock manager will not be aware of resource covering because it will not detect conflicts arising from locks on different resources. Care must be exercised for a principal $P_1$ to lock a resource $r_2$ for concurrency control without first acquiring the covering locks on $R_1$. No other principal $P_2$ can be permitted to acquire resource COVERing locks on $R_1$ because $P_2$ would then believe itself to be entitled to access $r_2$ without any locking at $r_2$. Hence, the accessing of $r_2$ by $P_2$ would not be prevented by the locks on $P_1$ and conflicting accesses would not be detected.

Thus, enforcement of resource covering is a function of the locking protocol. What must be ensured is that no conflicting locks, including the implicit locks will be concurrently held. Implicit locks are those that are covered by currently held locks, and hence are not materialized in the lock manager as locks whose conflicts can be detected. Accordingly, there must be at least one resource at which conflicts are materialized as explicit locks.

Because the purpose of covering is to avoid exposing the covered locks or any locks at the guarded resource whose locks are to be covered, a requirement of the present invention is that those principals taking out explicit locks on $r_2$ first take out one or more locks on resources $R_1$. Applying this requirement pervasively necessitates that resources in the multi-granularity hierarchy be locked in descending order.

The locks acquired higher in the multi-granularity hierarchy are called intention locks. Intention locks in $R_1$ PERMIT locking to occur at $r_2$ without violating resource covering by conflicting at at least one resource in $R_1$ with a lock needed in order to resource cover $r_2$. Intention locks themselves need not cover any locks. They must merely conflict with locks that do and hence prevent others from acquiring resource covering locks.

To simplify this explanation, it is assumed that all locks on resources in $R_1$ are required to have the same lock mode $M(R_1)$. Thus, lock mode M PERMITS$(R_1, r_2)$ lock mode N if a lock in mode M on a resource in $R_1$ serves as an intention lock on resources in $R_1$ for a lock in mode N on $r_2$. Further, as before, $$PERMITS(R_1, r_2)[M]=\{N|M\ PERMITS(R_1, r_2)N\} \qquad [6]$$

As with covering, if a lock mode N is in PERMITS$(R_1, r_2)[M]$, and if N DCOVERS P, then P is in PERMITS$(R_1, r_2)[M]$. Further, $$RCOVERS(R_1, r_2)[M] \subseteq PERMITS(R_1, r_2)[M] \qquad [7]$$

This says that if a lock mode on $R_1$ is strong enough to cover locks on $r_2$, then it is strong enough to permit them as well.

For the classical multi-granularity locking, there are two pure intention locks, IX which permits X and S locking on guarded resources, and IS which only permits S locking. In addition, the lock mode SIX is also defined, which is a lock that provides shared access to the resource on which it is held, and permits X locking on finer grained resources within. Table 1 defines the lock compatibilities of multi-granularity lock modes.

TABLE 1

| Lock Mode Compatability for Multi-granularity Locking | | | | | |
|---|---|---|---|---|---|
| Lock Modes | IS | IX | S | SIX | X |
| IS | x | x | x | x | |
| IX | x | x | | | |
| S | x | | x | | |
| SIX | x | | | | |
| X | | | | | |

Because a lock DCOVERS another does not mean that it RCOVERS that lock for any arguments to RCOVERS.

Thus, IS DCOVERS IS for the same resource, but IS does not RCOVER IS. An IS lock at each resource must be acquired explicitly if only preceded by other IS locking at guarding resources and must accordingly be exposed. IS locks do not provide any resource covering.

Determining Lock Mode Conflicts

At the heart of defining lock modes is the need to understand the constraints imposed by covering and intention locking. It is clearly not sufficient to simply assert that some locks are covering locks and others are intention locks. It is necessary to define lock modes such that the conflicts between locks with these lock modes provide the desired protection.

Thus, when defining locks on resources in $R_1$, lock mode conflicts that satisfy the following conflict constraint must be defined:

Lock mode M must CONFLICT with lock mode N on resources in $R_1$ if any of the following are true:

$$\text{RCOVERS}(R_1,r_2)[M] \text{ CONFLICTS } \text{RCOVERS}(R_1,r_2)[N] \quad [8]$$

$$\text{RCOVERS}(R_1,r_2)[M] \text{ CONFLICTS } \text{PERMITS}(R_1,r_2)[N] \quad [9]$$

$$\text{PERMITS}(R_1,r_2)[M] \text{ CONFLICTS } \text{RCOVERS}(R_1,r_2)[N] \quad [10]$$

Note that if $\text{PERMITS}(R_1, r_2)[M]$ CONFLICTS $\text{PERMITS}(R_1, r_2)[N]$, that this has no impact on whether M and N conflict.

Thus, holding a lock M at $R_1$ covers a lock N at $r_2$ by preventing other locks on $R_1$ from being held that either permit or cover locks on $r_2$ that conflict with N. The covering lock M ensures that no locking is needed by its holder at $r_2$ because all conflicting locks are stopped by it at $R_1$.

Holding an intention lock M at $R_1$ permits a lock N at $r_2$ by preventing locks at $R_1$ that cover locks at $r_2$ that conflict with N. However, other intention locks, and covering locks for locks at $r_2$ that do not conflict with N are not prevented. The intention lock M ensures that conflicts will be detected at $r_2$ rather than being subsumed by conflicts involving covering locks at resource set $R_1$.

The compatibility matrix for multi-granularity locking was given in Table 1. Recall that the same lock modes are defined at each level of the resource hierarchy. Thus, omitting the resource parameters of RCOVERS and PERMITS, the following relationships are obtained:

$$\text{RCOVERS}[X] = \{X, SIX, S, IX, IS\} = \text{PERMITS}[X] \quad [11]$$

$$\text{RCOVERS}[SIX] = \{S, IS\} \quad [12]$$

$$\text{RCOVERS}[S] = \{S, IS\} = \text{PERMITS}[S] \quad [13]$$

$$\text{PERMITS}[SIX] = \{X, S, SIX, IX, IS\} \quad [14]$$

$$\text{PERMITS}[IX] = \{X, S, SIX, IX, S\} \quad [15]$$

$$\text{PERMITS}[IS] = \{S, IS\} \quad [16]$$

$$\text{RCOVERS}[IS] = \text{RCOVERS}[IX] = \emptyset \quad [17]$$

Thus, RCOVERS and PERMITS constrain lock conflicts. IS and IX can be compatible as neither covers any locks. On the other hand, IX must conflict with S because IX PERMITS X, S RCOVERS S, and S CONFLICTS X. Because IX PERMITS X, IX CONFLICTS with modes that RCOVER any lock. Similarly, SIX CONFLICTS with S because SIX PERMITS X, and S RCOVERS S.

The constraint can be used in reverse, going from conflicts and RCOVERS to PERMITS. Hence, it can be determined from the lock mode conflicts on $R_1$, and what lock modes are covered on $r_2$, what lock modes are in $\text{PERMITS}(R_1, r_2)[M]$ for any lock mode M on resource set $R_1$. Lock mode M PERMITS any lock on $r_2$ that cannot be RCOVERed by any other lock in a conflicting mode when M is held.

For example, since IX is compatible only with IS and IX, which cover nothing, there are no constraints on what is in $\text{PERMITS}(R_1, r_2)[IX]$, and IX permits everything. IS CONFLICTS with X, but is compatible with IX, IS, S, SIX and the union of which RCOVERS {S, IS}. Hence, everything in PERMITS $(R_1, r_2)[IS]$ must be compatible with {S, IS}. This set is exactly {S, IS}.

Protocols for Multi-Granularity DAGs

Multi-granularity locking need not be restricted only to tree hierarchies. It is possible for the MGH to be a DAG. As with a tree, for each lockable resource, it must be ensured that locks acquired as intention locks (for permission) always conflict with the locks acquired as covering locks, and that covering locks conflict with covering locks. There is only one protocol when the MGH is a tree. The resources are locked in tree order from the root of the tree down, and unlocked in the reverse order. An explicit lock is never held on a resource without a lock also being held on its parent.

The same type of protocol is needed for an MGH DAG, but the fact that a resource in a DAG can have multiple parents presents a complication. The need is for the conflicts required by covering and intention locking to be materialized at at least one ancestor (guarding) resource in the form of locks with conflicting modes. This problem is solvable very generally with a quorum algorithm. A quorum algorithm guarantees that the sets constituting quorums for conflicting activities have non-null intersections. For purposes of the method of the present invention, the resources in the intersections will expose the locking conflicts.

For the locking protocol of the present invention, each resource that is a parent of a resource is assigned a weight which becomes the weight of the vote cast by locks on that resource. Quorums are then defined for each activity such that the sum of the quorums for pairs of conflicting activities exceeds the sum of the weights of the parents. This forces conflicting operations to need conflicting locks at at least one immediate ancestor. The locks on parents need not be explicit locks. That is, a parents can be locked with an implicit lock resulting from its being covered by some other set of locks on its ancestors.

Generalizing Covering

The notions of covering and private locking can be extended to arbitrary lock modes. As will be fully described below, covering can additionally be applied to logical locking and to data sharing cache management. To obtain these results, however, mutual exclusion must be reconciled with covering.

Logical Locks

One purpose of the present invention is to extend the notion of lock covering to logical locks. For purposes of this application, a logical lock is a lock that applies to a "logical" resource that does not necessarily directly map to a physical unit, for example, a disk block or disk area. Logical resources, and their logical locks, are usually at a higher level of abstraction than physical resources and their locks.

A distinguishing feature of physical locks is that they are frequently not held for transaction duration. Rather, physical locks are acquired, some localized action is performed, logical locks are acquired, and then physical locks are released. The notions of logical versus physical locks is captured more generally in the notion of multi-level transactions, where subtransactions use low level locks during their execution, acquire high level locks before they commit to their parent transaction and then release the low level locks.

It is desirable for low level physical locks to be higher in the locking granularity hierarchy than logical locks. Thus, "higher level" in the level of abstraction sense is opposite to the ordering in the MGH. Then the physical locks can be made to cover the logical locks, permitting private logical locking. However, the early release of physical locks, while retaining the logical locks, precludes physical locks from covering logical locks. New logical locks of one transaction can conflict with retained logical locks of another transaction even though the first transaction holds the physical locks with a covering lock mode.

For example, a lock is acquired on a page, a record lock is then acquired and the record updated. The page lock is released, but the record lock still protects the record. Another transaction, when it acquires the page lock, cannot assume that the page lock covers record locks for records on the page. This is not the case. There has been no intention lock left on the page by the earlier transaction. Hence, the new transaction must perform explicit record locking, even when it holds the page lock.

Logical Lock Covering

A different lock protocol permits the covering of logical locks. Physical locks can be retained for as long as the outermost transaction whose subtransaction acquired them remains active. This is, in fact, the protocol required for nested transactions. Retained X and S locks on physical resources would thus become covering locks for the logical locks. The problem with this situation is reduced concurrency.

The usual way to increase concurrency when covering impedes it excessively is to replace covering locks by intention locks, and then to explicitly acquire locks at the next lower level in the MGH. However, X and S are frequently needed to provide exclusion on the physical resource itself, enabling the resource to be correctly read or updated, not simply to act as covering locks. Used in this way, a principal would acquire an X (or S) lock, update (or read) a page, and then demote the lock to IX (or IS) when exclusion was no longer required. These intention locks indicate that records of the page were being locked individually.

Unfortunately, the above protocol does not improve concurrency. An IX intention lock prevents the acquisition of the X (S) lock needed for exclusion. Indeed, IX must conflict with X (S) because X (S) is a covering lock. The difficulty here is that X and S lock modes are being used both for covering and for exclusion.

A solution is to introduce new lock modes that provide the exclusion needed on the physical resource without covering the logical locks. These new lock modes can then be compatible with the intention lock modes IX and IS. For purposes of this application, these new lock modes are named M (modify) and R (read). The lock compatibility matrix for the expanded set of lock modes is given in Table 2. Note that M DCOVERS IX, and hence is an intention lock for X, and similarly, R is an intention lock for S. M locks conflict with other M locks to provide the required exclusion. An R lock is similar to an IS lock but R locks conflict with M locks to 3 provide exclusion.

TABLE 2

| Compatibility Matrix Including M and R | | | | | | |
|---|---|---|---|---|---|---|
| Lock Modes | IS | R | IX | M | S | SIX | X |
| IS | x | x | x | x | x | x | |
| R | x | x | x | | x | x | |
| IX | x | x | x | x | | | |
| M | x | | x | | | | |
| S | x | x | | | x | | |
| SIX | x | x | | | | | |
| X | | | | | | | |

Accordingly, the protocol can be summarized as follows:

1. Request a covering (X or S) lock on resource, for example, a page. If successful, keep locks lower in the MGH (for example, logical locks) private, reducing lock overhead. If there is a conflicting request after the subtransaction needing these locks has committed, demote these locks to IX or IS and simultaneously post all locks lower in the MGH that they were covering.

2. If the covering lock request fails, request exclusion via a non-covering M or R lock on the resource. M and R lock modes require locks lower in the MGH to be posted publicly, exactly as with IX and IS intention locks. At subtransaction commit, demote M and R lock modes to IX and IS respectively, permitting other principals to acquire M and R locks and hence to access the resource.

Usually, but not always, locks on low level physical resources can cover the logical resources of a multi-level transaction. Some systems permit logical locks to be acquired without first having obtained physical locks. Where both covering and non-covering can occur, these cases must be carefully distinguished so that appropriate lock protocols are employed. This consideration is fully discussed below.

Cache Management

There is an interaction between locking and cache management in database systems. Certain kinds of locking strategies either enable or disable certain forms of cache management. However, this dependency is not absolute. Cache management strategies are described below with particular attention to their impact on local and global locking. The cache management strategies differ depending upon the states of pages that are made available between their stays at local systems, where a local system includes a local cache, cache manager and local lock manager.

A first cache management system is known as "transaction consistent pages." In a system that employs transaction consistent pages, a page is only transferrable among systems between transactions. The page made available is always the most recent version, and it reflects all and only updates of committed transactions. The transaction consistent pages system is realized by holding COVERing locks on the pages for transaction duration. X locks are used for updating a page, while S locks are used for reading pages. In larger granule MGH locking, both covering and intention locking can be exploited. Only these "physical" locks need to be posted globally. Thus, between local systems, the smallest granules are pages. Within a local system, transactions have the capability of using locking with arbitrary granularity to provide the maximum possible concurrency when the local system has its own lock manager. However, the record/ operation locking (logical locking) at local systems is private.

A second method of caching is called "update current pages". This method guarantees that whenever a local system updates a page, that the version of the page updated reflects all prior updates. That is, the updates are serialized, not concurrent, and the updating local system sees all the preceding updates. Thus, the pages transferred between systems are always current pages, but can contain uncommitted updates.

The update current pages protocol is realized by holding a non-covering exclusion lock, either M or R, on the page while it is being acquired or transformed and record locks are acquired. But this does not preclude other systems from holding record locks. Pages are only transferred or written to disk by the current holder of an M or R lock, hence ensuring that only the current page is transferred. M and R locks can be demoted to IX or IS when exclusion is no longer needed. Record locks must be posted globally, as M and R are only intention locks. So, the penalty for the increased concurrency of update current pages is additional global locking.

It may be desirable to permit multiple systems to update the same page without the update current pages serializing of updates. Thus, the concurrent update of pages strategy does not require a current copy of the page to be updated.

Rather, this strategy can be accomplished by having a page manager ("PMAN") merge the updates for all records on a page, and read and write the page to disk. An updater is required to ship its record update to PMAN prior to releasing its X lock on it. A way to think about this is that, instead of reading and writing pages to disk, "reading" and "writing" records is directed to the appropriate PMAN, as if the granularity of the data were the record, not the page. This is similar to transaction consistent pages applied to records, not pages.

The concurrent update of pages cache management system requires the locks held by concurrent updaters on a page to be compatible, while preventing the page from being locked with a conflicting covering lock. The intention locks IX and IS are not covering locks, but they are compatible with each other. They prevent covering locks on the page. Hence, updaters acquire IX locks on the page, while X locking the records updated. Because IX is not a covering lock, the locks on records must be posted globally.

A PMAN may sometimes need to read the prior version of a page from disk to merge an update into it, but this is transparent to the updaters except for its performance impact. A smart PMAN will try and keep in its cache copies of pages for which there are outstanding locks that permit updates so as to avoid the need for the read from disk.

Private Locking

Usually lock managers are conflict detectors where the conflict is based on the lock modes for locks on a single given resource. The interdependencies between resources are typically handled by the users. When dealing with multiple lock managers, it is essential to know the nature of extensions, if any, that are needed by lock managers. Also, information that must be known by each lock manager about resource and lock dependencies must be described. Accordingly, it is essential to identify the lock managers or users that have access to information about multi-granularity locks. This is essential to the realization of local lock managers that are capable of private locking. Private locking entails that some locks that the local lock manager has granted its principals are not visible to the global lock manager and that the local lock managers do not have access to the specifics of the MGH.

The prior discussions of covering, permission, and exclusion enable the definition and use of lock modes to trade-off concurrency for lock overhead. Using multiple lock managers can provide an even more dramatic reduction in lock overhead while preserving concurrency to allow a local lock manager to service lock requests from some subset of the principals, e.g. clients of one server. Within this collection of principals, concurrency is maximized. Lock overhead is reduced by exploiting lock covering so as to make it possible to lock some resources locally. These locks are not made visible to global lock management.

In order for a lock manager to privately mange its locks, two properties must be satisfied. First, the global locks of the lock manager must cover the local (private) locks acquired by any of its principals, and the global locks must be seen as being held by the lock manager. The local locks need not then be known globally. Second, the global locks of the lock manager must permit all global locks it holds. In other words, the lock manager must follow the MGH protocol. These intention locks prevent another lock manager from acquiring covering locks that conceal conflicts with the locks held by this lock manager.

Because the local lock manager is not privy to the specifics of the MGH, principals must request resources in the order required by this protocol. This requires the principal to acquire via explicit lock requests all needed intention locks prior to requesting a lock.

There are a number of ways that a lock manager can hold global covering locks on the resources that it manages. For a system with only one lock manager, this lock manager implicitly has a permanent exclusive lock on all resources. For a partitioned distributed system, each lock manager manages the locks of a partition and implicitly has a permanent exclusive lock on the partition. For a data sharing system with multiple lock managers, the locks held by each lock manager can change over time and are not necessarily exclusive locks. Hence, the protocol of lock management must be very explicit. This is discussed below.

Owners and Holders

For each resource, a requestor needs to make lock requests to a system component that can act as a lock manager. This lock manager is called the owning lock manager or the owner. The owner may grant a lock to any of several principals. A principal that holds a lock is called the current holder of the lock. An owner is responsible for keeping track of who currently holds locks on its owned resources and for detecting lock conflicts. The owner must also prevent deadlock in some manner, for example, detection or time-out.

In a data sharing system with multiple lock managers, ownership is context dependent. A local lock manager on a node may act as owner for all locks insofar as the processes or transactions executing on that node are concerned. A local lock manager does not permanently hold resources. Before it grants requests for one of its "owned" resources, it must acquire covering locks on the resource at the global level of the system from the global owning lock manager, thereby becoming the lock holder at this level. Thus, it is the local lock manager, not its principals, that holds the locks at the global system level and then owns them for its local principals. This kind of hold/own configuration can occur at multiple levels of a system.

While the identity of the local lock manager that holds a lock can change rather rapidly, the identity of the lock manager that owns the locks for any given principal is usually relatively static. This permits principals to readily identify the lock manager to which a lock request should be made for some resource. There are a number of ways that global distributed system ownership can be handled.

One such example is a situation in which a single global lock manager ("Glock manager") owns all locks in the system. In that case, any local lock manager would ask the Glock manager for the lock. A second example is the case in which each local lock manager owns some known subset of all the locks in the system. This subset may change with time, but it does so slowly, for example, when an owner lock manager crashes. Other lock managers can then learn the identity of the lock manager to which requests should be directed.

Local and Global Locks

Locks requested by principals of a local lock manager that are covered by global locks already held by the lock manager can be granted locally. If the local lock manager does not have a covering lock for the locally requested lock, then such a lock must be acquired. After the local lock manager holds the covering lock or locks, it can grant the requested lock to its principal as a local lock. Thus, a local lock manager must record, for each resource, the mode of the lock that it holds for the resource at the owning global lock manager. In addition, the local lock manager must keep track of the local locks on a resource and the local principals that hold them.

There are four results of a lock request for a covering lock. First, the covering lock is granted. The requesting principal can avoid posting the covered locks to the local lock manager. Should a conflicting request come from a local principal, the holder can demote its lock to an intention lock but must simultaneously acquire the locks uncovered by the demotion from the local lock manager. Second, the intention lock is granted instead of the covering lock, and the local lock manager has the covering lock. Locks lower in the MGH must be posted to the local lock manager, but need not be requested globally. A principal can request these locks as local locks. The principal must be informed that the local lock manager has a covering lock on the resource.

Third, the intention lock is granted instead of the covering lock, and the local lock manager does not have the covering lock. Locks lower in the MGH must be posted to both local lock manager and the global owning lock manager. Requests for these locks are designated as global lock requests. This time, the principal needs to know that the lock manager does not have the covering lock.

Fourth, no lock is granted. The requesting principal may block waiting for the lock to be granted. Loch for resources lower in the MGH should not be requested.

Direct covering is the easiest covering situation to manage. For direct covering, a lock manager must hold a lock on the same resource that is requested by its principal in a mode that is at least as strong as the requested mode. As previously noted, a lock manager retains information that permits it to determine direct covering needs.

For resource covered locks, the local lock manager does not need to have any lock directly on the requested resource itself. This is important because it permits such locks to be managed entirely locally, without exposing any locks on the resource at a global level. The result, however, is that the local lock manager does not know whether locks being requested are resource covered unless the requesting principal informs it.

Thus, one required extension to the functionality of lock managers is for information to be conveyed across the lock manager interface that permits a principal to know about covering locks. Then, the principal, using its knowledge of the MGH, can instruct the lock manager in its task of managing resource covered locks.

Acquiring Global Locks

The local lock manager, in its request to the global lock manager for a covering lock, asks for a lock mode that is, at a minimum, equal to the lock mode desired by its principal. To maximize private locking, the global lock manager grants the strongest lock mode that it can consistent with the current disposition of the lock that is at least as strong as the mode requested. For example, if the request is for an S lock, the local lock manager indicates to the global lock manager that this is the minimum acceptable lock mode. If the resource is currently not locked, the global lock manager grants an X lock to the local lock manager. If the resource is currently held in some mode compatible with S, but not X, then the global lock manager grants an S lock. If an S lock cannot be granted, then the request is denied or blocked.

When the global lock manager blocks the request, it notifies the local lock managers that are holding the lock in conflicting modes, asking them to release or demote the lock. The global lock manager supplies these lock managers with the resource name and lock mode requested, so that they can respond appropriately.

Figure 2:
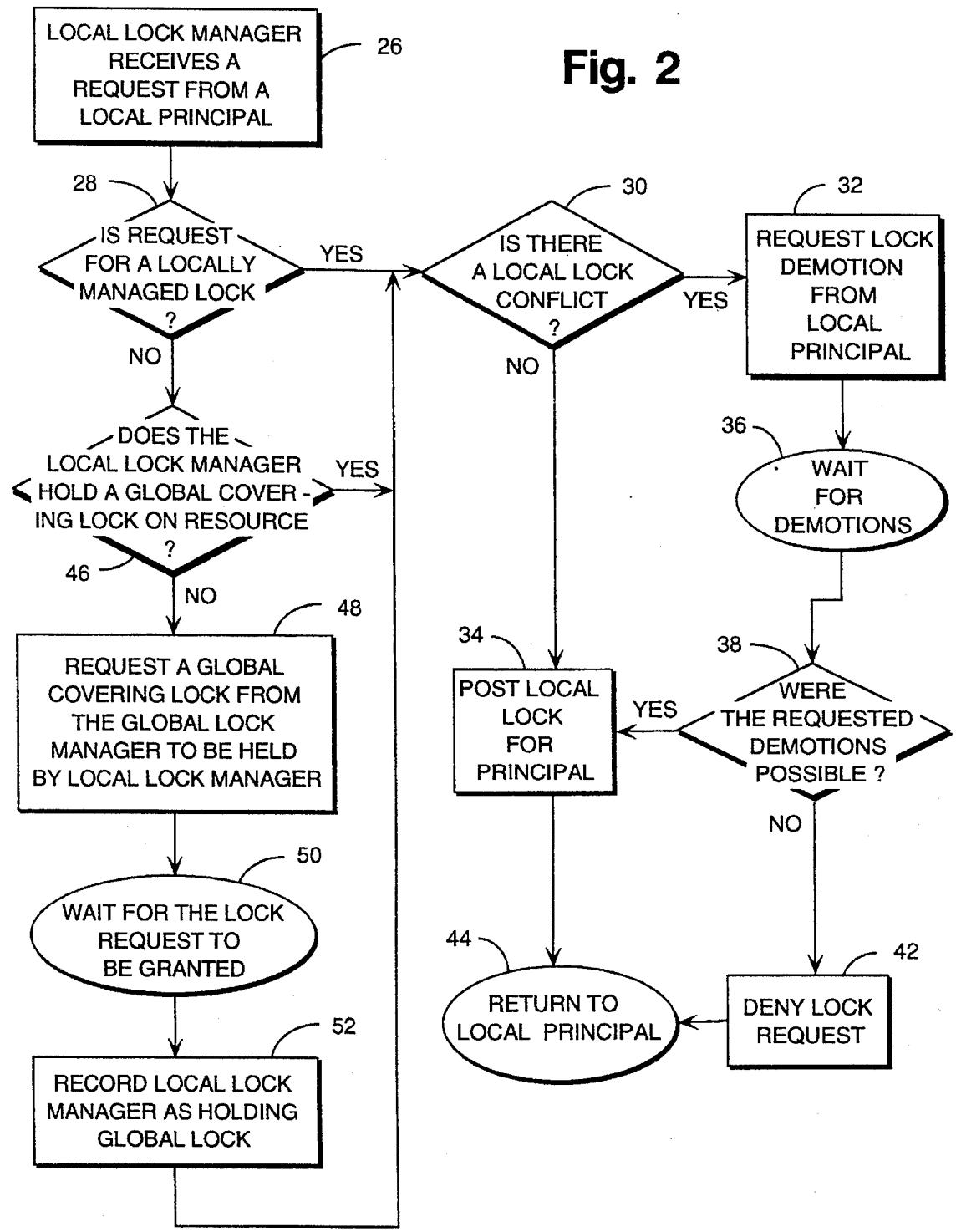
FIG. 2 is a flow diagram showing the operation of a private lock manager according to the present invention.

FIG. 2 is a flow diagram showing this aspect of the present invention. As previously noted, an important benefit of private lock management is the reduction of communication overhead between local lock managers in a system and the global lock managers. These savings are accentuated by the method of the present invention, which includes the definition of novel lock modes to allow local management previously performed at the global level to be performed locally.

At step 26, a local lock manager receives a request for access to a shared resource from a local principal. The local lock manager determines whether the lock associated with the resource requested is locally managed at step 28. Lock requests must be evaluated by local lock managers because not all locks are exposed globally. If the lock is locally managed, the local lock manager receiving the request evaluates whether the locks it has previously granted allow the request at step 30. If the lock requested does not conflict with locks already granted, the lock request is posted for the local principal at step 34. Control returns to the local principal at step 44.

If a local conflict is identified at step 30, lock demotion by local principals is requested at step 32. At step 36, the local lock manager waits for the necessary demotions of the lock mode to occur. At step 38, the local lock manager determines whether the requested demotions have been performed and, if so, posts the lock request at step 34. If the demotions are not possible, the lock request is denied at step 42. Control returns to the local principal at step 44.

Returning to step 28, the local lock manager determines whether it holds a global covering lock at step 46 if the lock on the requested resource is not locally managed. If a global covering lock is held by the local lock manager, execution proceeds to step 30 and continues as previously described. If the local lock manager does not hold a global covering lock on the requested resource, such a lock is requested from the global lock manager at step 48. If the request for the global covering lock is granted, the global lock will be held by the local lock manager. At step 50, the local lock manager waits for the global lock to be granted. Finally, the lock manager is recorded as being the holder of the global lock at step 52 and execution continues as previously described at step 30.

Acquiring Local Locks

When a principal requests a lock from its local lock manager, in addition to lock mode and resource identifier arguments, a requestor indicates whether the lock request can be purely local, in other words, whether a lock on another resource in the MGH covers the requested lock. This informs the local lock manager that it does not need to hold a global lock that directly covers the requested lock.

To facilitate resource covering and enable purely local locking, whenever the local lock manager grants a lock, it returns to the principal the mode of the lock that the lock manager holds globally for that resource. This permits the principal to decide whether subsequent lock requests for finer grained resources need to have global covering locks or not. That is, the local principal knows whether the local lock manager holds a global covering lock on a resource higher in the MGH.

For example, a local principal is told when it requests an IX lock on a file that the local lock manager holds a global X lock on the file. Accordingly, when the principal requests X locks on records of the file, it tells the local lock manager that the requested locks can be purely local.

Demoting Locks

Whenever a covering lock is demoted or released, all uncovered locks need to be posted to the owning lock manager prior to (or simultaneously with) this demotion. For example, if one demotes a file lock from S (a covering lock) to IS, then all S locks on pages of the file must be posted to the owner of the page (and file) locks. This standard lock de-escalation is well-known in the field.

Lock demotion can be very simple, as is the case when no lower level locks in the MGH are uncovered. The mode of the lock as held by the requesting principal is simply reduced. In this case the demotion is always possible. There is a need to make sure that resource covering requirements are satisfied because local locking introduces some complication. Two demotion situations are explained in the following section.

Local Demotion

When a principal releases a local lock, the lock manager can choose to retain the lock itself. By retaining such locks, the lock manager can privately grant requests for the locked resources. This exploits high-water mark locking, in which the lock manager retains a lock with the highest lock mode that any of its principals has recently requested. Subsequent requests for lesser lock modes on the same resource can be managed locally.

When the local lock manager receives a conflicting request for a lock from a local principal, it informs the local principals currently holding the lock of this request, indicating that the demotion request is a local request. In this case, the local holders must post local locks for the resources they are accessing lower in the MGH that have been uncovered. The global locks held by the local lock manager do not change.

When a local lock in relinquished or demoted, it permits increased concurrency among the local principals. There is no impact on global concurrency because the local lock manager continues to hold the same global locks. Only changes in global locks, held by the local lock manager, can impact global concurrency.

Global Demotion

A local lock manager has the capability to unilaterally release global locks on resources without local locks. These locks cannot resource cover other locks. To release or demote a global lock on a resource that is currently locked by one of its principals, even if in a weaker mode, requires a determination of whether finer grained locks are uncovered by this.

A local lock manager has not need to demote global locks on resources being used by local principals unless these locks cause conflicts at the global lock manager. When the global lock manager receives a conflicting request for a global lock from some local lock manager, it notifies local lock managers holding the lock. The global lock cannot be demoted unless the local lock manager acquires global locks on the uncovered locally locked lower level resources of the MGH. But local lock managers do not have direct information about resource covering and the MGH.

Figure 3:
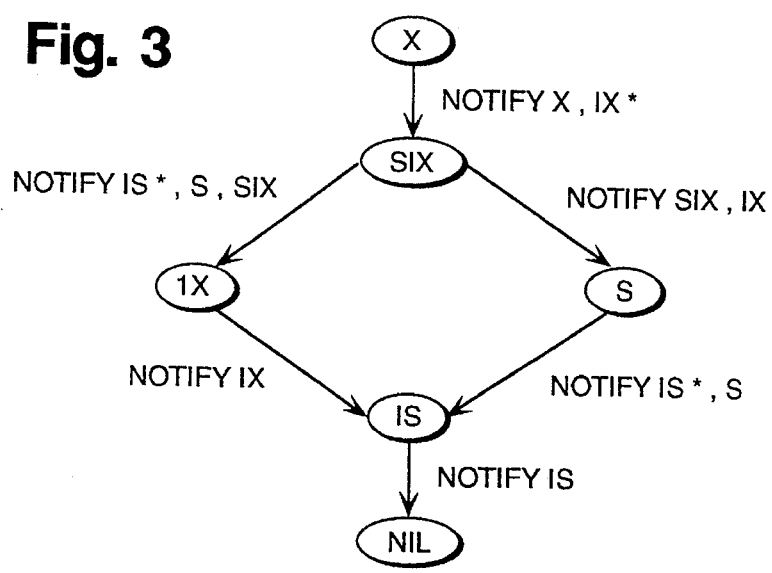
FIG. 3 is a block diagram that illustrates the notification requirements for multi-granularity locking.

Thus, a local lock manager hence may need to notify its principals holding locks on the resource for which demotion is requested so that its principals can inform it about resource covered locks that are uncovered by the demotion. Depending on the demotion requested, some local principals need notification while others do not. The notification requirements are illustrated in FIG. 3 for multi-granularity locking. To deal with a lock manager that supports arbitrary lock modes, it may be necessary to notify all holders of local locks on a resource whose global lock is to be demoted, to conservatively deal with the unknown change in covering.

Local principals, when they are notified concerning a demotion of a global covering lock must, before they accede to the demotion, ensure that uncovered locks are posted appropriately. These principals must inform the local lock manager which additional locks must be posted. After each of these locks is directly covered by a global lock, the principal notifies the local lock manager that the requested global lock demotion is acceptable.

If the principal itself holds a covering lock that lock demotion turns into an intention lock, it must acquire uncovered locks locally and cause the local lock manager to acquire covering locks by indicating that these resources are not to be purely locally locked. If local locks are already held, then the principal instructs the local lock manager as to which locks are uncovered and directs the local lock manager to acquire global locks that directly cover them.

FIG. 3 is a block diagram that illustrates the notification requirements for multi-granularity locking. Holders of local locks on a resource must be notified by a local lock manager when global lock demotion is requested. Both holders of locks that would no longer be directly covered and holders of intention locks, indicating resource covered locks are being held, must be notified. These cases are indicated in FIG. 3 with an asterisk.

Figure 4A:
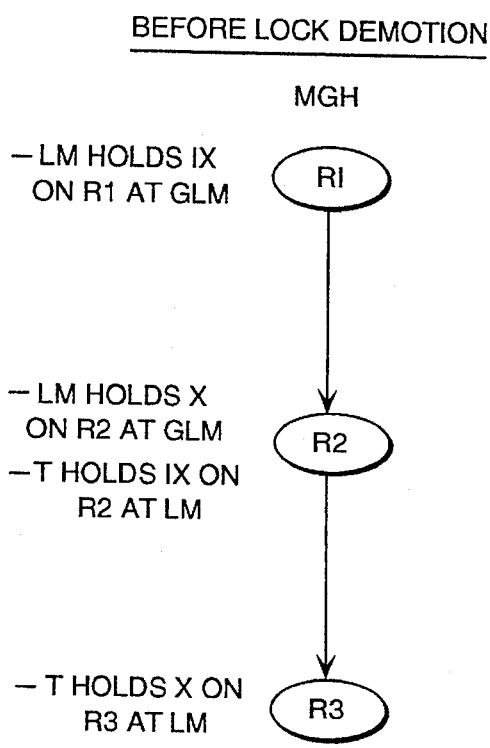
FIG. 4A and 4B are a block diagram illustrating the impact of global lock demotion on local and global locks.
Figure 4B:
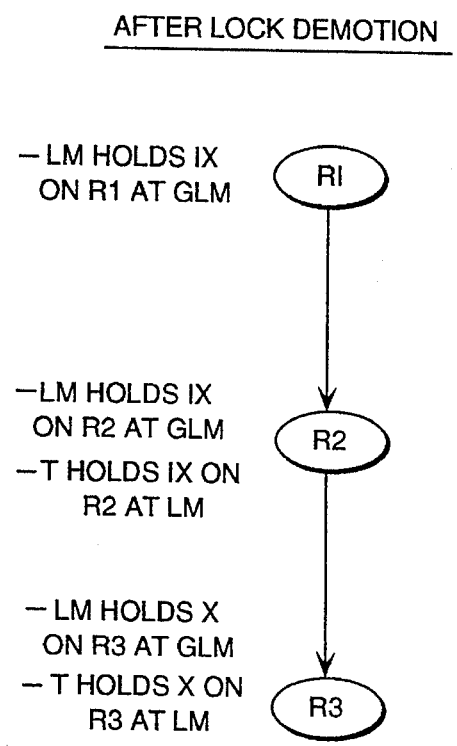

FIG. 4 is a block diagram illustrating the impact of global lock demotion on local and global locks. Three resources $R_1$, $R_2$ and $R_3$ are shown both before and after a lock demotion. Before the demotion is requested, a global lock manager holds an IX lock on $R_1$ and an X lock on $R_2$. Additionally, a transaction T holds an IX lock on $R_2$ and an X lock on $R_3$ at a local lock manager.

When a local lock manager is requested to demote its X lock on a resource $R_2$ to IX, the lock manager notifies transaction T because the lock manager holds a covering lock and T has an intention lock. T informs the lock manager that its X lock on $R_3$ has been uncovered and needs a global covering lock. Thus, after the requested demotion, the local lock manager holds an IX lock on $R_1$, an IX lock on $R_2$ and an X lock on $R_3$, while T's local locks are unchanged.

Concurrency and Locking Overhead

Lock managers that perform private locks can reduce dramatically the global locking overhead burden of data sharing systems. It is lock covering that permits private locking by ensuring that any conflicts that might be introduced by the local locks are always materialized by the covering locks as well. Intention locks make it possible for local locks to coexist with explicit (globally known) locks on the same resources.

A database system can adjust its locking strategy between using covering and intention locks depending on the tradeoff it sees between concurrency and lock overhead. For example, if too much blocking on locks is encountered, more locks might be made global via demotion of covering locks to intention locks. If system lock overhead is too high, it can be reduced by making formerly global locks private via the acquisition of covering locks, reducing lock overhead. In general, more locks might be made global for hot data, improving its concurrency, while retaining as private more of the locks for cold data.

Rdb/VMS supports this kind of boundary changing, for example, when covering locks are demoted to intention locks, if the distributed lock manager ("Dlock manager") indicates that a lock request is pending for a resource. The demotion is not done by the Dlock manager directly. Rather, the Dlock manager notifies the principal holding the lock, which must then decide whether demotion is possible. In the Rdb/VMS case, the principals are processes executing the database system for a riser.

Using the Dlock manager, all locks posted are global, with covering employed so as to entirely avoid posting the locks. That is, users can acquire covering locks so as to avoid posting finer grained locks. The result is that all other users experience the same concurrency control interference, regardless of where they are executing.

Local Locking and Cache Management

Thus, the method of the present invention generalizes concurrency control and the trade-offs that are made possible. With private locking at a local lock manager, the local lock manager obtains a covering lock, and then makes the locked resource available to all its local principals. Here, covering is used so as to permit locking conflicts to be dealt with locally. Remote users are delayed by the covering locks, but local users see the fine-grained locks because these locks are posted to the local lock manager. This capability is in addition to a principal obtaining a covering lock for itself, which remains possible.

Being able to manage locks locally is crucial for reducing lock overhead. The overhead of obtaining a global lock in a distributed system, via the Dlock manager, is an order of magnitude larger than when the locks are managed locally and privately. So local lock management can both reduce lock overhead and improve concurrency for principals of the local lock manager.

A particularly important example exploits both private locking and the new lock modes to permit local lock managers to optimize distributed cache management. Prior solutions either did not exploit local lock managers and private locking or required the smallest locking granule for remote principals (posted globally) to be the page. The solution permits several alternative locking scenarios, depending on how hot the data on a page happens to be. First, pages can be globally locked by a user with a covering lock, either X or S. No record locks need be posted, even locally. This is a low lock overhead option. In fact, if an MGH exists, a covering file lock can make individual page locks unnecessary. Second, pages can be globally locked by the local lock manager with a covering lock, either X or S. No record locks need be posted globally. Principals of the local lock manager post local intention or covering locks for the page. With local intention locks, several local principals can acquire record locks on the same page, hence improving concurrency but increasing local lock overhead.

Third, pages can be globally locked by the local lock manager with an intention lock, one of IX, IS, M or R. Now record locks must be posted globally. Exclusion access to the page can be realized using M and R intention locks, demoted to IX or IS when exclusion is no longer required. This alternative permits serial access to data on a page by even remote principals without necessarily waiting to end of transaction. Lock overhead is high because of the global locking.

Fourth, pages can be locked via the request for a global covering lock, as in the first alternative. The lock actually granted can be a covering lock, either local or global, or an intention lock, etc. This alternative gets the strongest lock possible given current resource contention. Such strong locks can be demoted should subsequent conflicts arise, as long as previously covered locks are posted.

Early Lock Release

Not all locks are held until end of transaction by lock principals. Physical locking for cache management, or more generally, multi-level transaction locking, permits locks to be relinquished early. This is important for high concurrency. Concurrency is increased as principals can acquire and release locks on subtransaction boundaries.

Thus, there has been described herein a method for performing private lock management in a distributed dam sharing computer system. It will be understood that various changes in the details and arrangements of the implementation described herein will occur to those skilled in the art without departing from the principle and scope of the present invention. Thus, while the invention has been described with reference to the presently contemplated best mode for practicing the invention, it is intended that this invention only be limited by the scope of the appended claims.

What is claimed is:

1. A method for performing lock management in a distributed data sharing computer system in which a plurality of resources are shared by a plurality of servers, each of said servers associated with one of a plurality of local groups of servers, each of said local groups having a local lock manager associated therewith, said computer system having a global lock manager associated therewith, said method comprising the steps of:

defining a plurality of lock modes to govern the availability of said resources to said servers, including defining at least one lock mode that conflicts with at least another of said lock modes without covering any locks associated with said another of said lock modes;

assigning a lock to each one of said resources by one of said local lock managers, unless the requested lock has not been previously assigned by said global lock manager to one of said local lock managers, in which case said global lock manager assigns said lock to one of said local lock managers, said one of said local lock managers assigns said lock to said requesting server, each said lock being indicative of a specific one of said plurality of lock modes;

receiving requests for access to specific ones of said resources; and administering said requests received from one of said plurality of servers by a local lock manager associated with the requesting server without exposing any of the lock modes associated with the locks on said resource to said global lock manager.

2. The method of claim 1 further comprising the step of managing a cache in said distributed data sharing computer system according to a transaction consistent pages protocol.

3. The method of claim 1 further comprising the step of managing a cache in said distributed data sharing computer system according to an update current pages protocol.

4. The method of claim 1 further comprising the step of managing a cache in said distributed data sharing computer system according to a concurrent update of pages protocol.

5. The method of claim 1 further comprising the step of managing a cache in said distributed data sharing computer system according to any combination of a transaction consistent pages protocol, an update current pages protocol and a concurrent update of pages protocol.

6. A method for performing lock management in a distributed data sharing computer system in which a plurality of resources are shared by a plurality of servers, each of said servers being associated with one of a plurality of local groups of servers, each of said local groups having a local lock manager associated therewith, said method comprising the steps of:

defining a plurality of lock modes to govern the availability of said resources to said servers, including defining a first lock mode that conflicts with at least another of said lock modes without covering any locks associated with said another of said lock modes;

assigning a lock indicative of said first lock mode to a specific one of said resources;

assigning a lock to each of the remaining ones of said resources, each of said locks assigned to the remaining ones of said resources being indicative of one of said specific lock modes;

receiving a request from one of said servers for access to said specific one of said resources, said request being indicative of a desire to access said specific one of said resources;

evaluating the locks assigned to each of said resources to determine whether said first lock mode conflicts with said lock modes assigned to any of said resources;

granting said request if said first lock mode does not conflict with the lock mode associated with the lock assigned to any of said resources; and denying said request if said first lock mode does conflict with the lock mode associated with the lock assigned to any of said resources.

7. The method of claim 6 further comprising the step of managing a cache in said distributed data sharing computer system according to a transaction consistent pages protocol.

8. The method of claim 6 further comprising the step of managing a cache in said distributed data sharing computer system according to an update current pages protocol.

9. The method of claim 6 further comprising the step of managing a cache in said distributed data sharing computer system according to a concurrent update of pages protocol.

10. The method of claim 6 further comprising the step of managing a cache in said distributed data sharing computer system according to any combination of a transaction consistent pages protocol, an update current pages protocol and a concurrent update of pages protocol.

11. A method for performing lock management in a distributed data sharing computer system having a plurality of shared resources, said distributed data sharing computer system comprising a local lock manager, a global lock manager and a local principal, said local lock manager receiving a request for access to one of said shared resources from said local principal, said method comprising the steps of:

defining a plurality of lock modes to govern the availability of said resources;

assigning a lock to specific ones of said resources, each said lock being indicative of one of said lock modes;

receiving a request for access from said local principal, said request being indicative of a desire to access a specific one of said resources having a specific lock mode assigned thereto; and determining whether a lock on said specific one of said resources is locally managed, and (a) if the determination is made that the lock is locally managed, administering the request locally, (b) if the determination is made that the lock is not locally managed, further determining whether said local lock manager holds a global covering lock on said specific ones of said resources, and (i) if the further determination is made that said local lock manager holds a global covering lock on said specific one of said resources, administering the request locally, and (ii) if the further determination is made that said local lock manager does not hold a global covering lock on said specific one of said resources, requesting said global covering lock manager and after said request for said global covering lock is granted, administering said request locally, including granting said local request under local management, thereby enforcing a descending lock hierarchy.

12. The method for performing lock management of claim 11 said method further comprising the steps of:

evaluating the lock modes of said locks assigned to said plurality of resources to determine whether said request for access conflicts with any of said lock modes of said locks assigned to said plurality of resources;

posting said request for access if said specific lock mode indicated by the lock assigned to said specific one of said plurality of resources does not conflict with the lock modes indicated by the lock assigned to any other of said plurality of resources;

determining if demotion of said lock modes indicated by said locks assigned to any of said plurality of resources to allow said request for access to be granted is possible;

demoting said lock modes indicated by said locks assigned to any of said plurality of resources if possible and granting said request; and denying said request for access if the lock mode indicated by the lock assigned to the resource requested conflicts with the lock modes indicated by the locks currently assigned to any of said plurality of resources or if demotion of the lock modes currently assigned to any of said plurality of resources is not possible.

13. The method of claim 11 further comprising the step of managing a cache in said distributed data sharing computer system according to a transaction consistent pages protocol.

14. The method of claim 11 further comprising the step of managing a cache in said distributed data sharing computer system according to an update current pages protocol.

15. The method of claim 11 further comprising the step of managing a cache in said distributed data sharing computer system according to a concurrent update of pages protocol.

16. The method of claim 11 further comprising the step of managing a cache in said distributed data sharing computer system according to any combination of a transaction consistent pages protocol, an update current pages protocol and a concurrent update of pages protocol.

17. An apparatus for performing lock management in a distributed data sharing computer system in which a plurality of resources are shared by a plurality of servers, each of said servers being associated with one of a plurality of local groups of servers, each of said local groups having a local lock manager associated therewith, said computer system having a global lock manager associated therewith, comprising:

means for defining a plurality of lock modes to govern the availability of said resources to said servers, wherein at least one of said lock modes is defined to conflict with at least another of said lock modes without covering any locks associated with said another of said lock modes;

means for assigning a lock to each one of said resources with either one of said local lock managers or said global lock manager, each said lock being indicative of a specific one of said plurality of lock modes;

means for receiving requests for access to specific ones of said resources; and means for administering said requests for access to specific ones of resources with said local lock manager without exposing the lock modes associated with the locks on said resources to said global lock manager unless said request for access to specific ones of said resources relates to a resource that is not covered by a lock mode previously assigned to said local lock manager by said global lock manager.

18. The apparatus of claim 17 wherein said distributed data sharing computer system comprises a cache managed according to a transaction consistent pages protocol.

19. The apparatus of claim 17 wherein said distributed data sharing computer system comprises a cache managed according to an update current pages protocol.

20. The apparatus of claim 17 wherein said distributed data sharing computer system comprises a cache managed according to a concurrent update of pages protocol.

21. The apparatus of claim 7 wherein said distributed data sharing computer system comprises a cache managed according to any combination of a transaction consistent pages protocol, an update current pages protocol and a concurrent update of pages protocol.

* * * * *